United States Patent [19]

Holmes

[11] 4,150,702
[45] Apr. 24, 1979

[54] LOCKING FASTENER

[76] Inventor: Horace D. Holmes, 28576 Green Willow, Farmington Hills, Mich. 48018

[21] Appl. No.: 876,863

[22] Filed: Feb. 10, 1978

[51] Int. Cl.² ........................................ F16B 39/02
[52] U.S. Cl. ............................. 151/22; 151/14 R; 85/46
[58] Field of Search ............... 151/22, 14 R; 85/46

[56] References Cited

U.S. PATENT DOCUMENTS

| | | | |
|---|---|---|---|
| 1,828,856 | 10/1921 | Bridges | 151/14 R |
| 3,346,278 | 10/1967 | Yocum | 85/46 |
| 4,071,067 | 1/1978 | Goldby | 151/22 |
| 4,076,064 | 2/1978 | Holmes | 151/22 |

Primary Examiner—Robert A. Hafer
Attorney, Agent, or Firm—Krass and Young

[57] ABSTRACT

A vibration-resistant prevailing torque fastener combination comprising a conventional first element having a standard thread form with first flank angles and a modified second element having a thread form characterized by second steeper flank angles over the entire length thereof, and a truncated root caused by foreshortening of the flanks over a portion of the thread length to produce a helical flat which firmly engages and typically deforms the crest of the first element when threadedly engaged therewith. A difference in flank angles provides longitudinal clearance to receive the deformed material during the threaded engagement. Tapping tools are disclosed.

10 Claims, 7 Drawing Figures

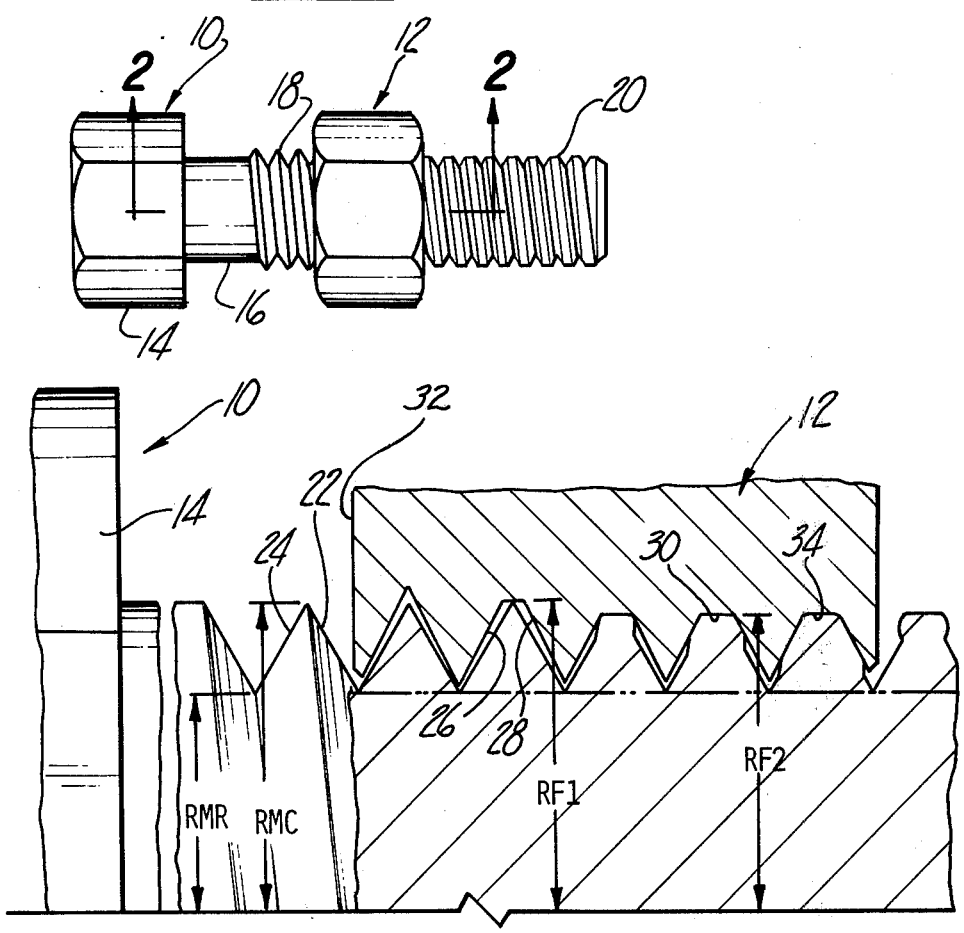

4,150,702

LOCKING FASTENER

INTRODUCTION

This invention relates to vibration-resistant fasteners of the prevailing torque type and to tapping tools for forming threads which result in vibration-resistant fasteners of the prevailing torque type.

BACKGROUND OF THE INVENTION

The prior art shows many years of concern over the production of vibration-resistant fastener combinations. Simply stated, one approach involves the use of additional elements such as lock washers, cotter pins and glue bonds which are separate and distinct from the male and female elements of the fastener combination. The assembly of such elements adds significant cost to a high production application. Another approach involves the formation of shallow angled surfaces in the male and female thread forms which telescopically engage under axial tension to produce a self-locking effect. This approach has the negative effect of being very difficult and expensive to manufacture because of the close tolerances required. Other approaches such as deforming the nut after application are also disclosed in the prior art.

I have discovered that the key to a vibration-resistant self-locking fastener combination lies in the realization of firm radial contact between the male and female thread forms such that all lateral movement is constrained under vibration conditions. By eliminating the possibility for lateral shifting or relative movement between the thread forms, the high friction condition is maintained and an unwinding of the threads under axial tension conditions is eliminated. I have embodied this concept in a free-running fastener combination as disclosed in my co-pending application for U.S. patent, Ser. No. 755,437, filed Dec. 29, 1976 as a continuation of U.S. Ser. No. 620,566, filed Oct. 8, 1975, now abandoned. I have now found that I can apply this concept to a prevailing torque fastener combination.

BRIEF SUMMARY OF THE INVENTION

The principal object of my invention is to provide a prevailing torque fastener combination consisting of conjugate male and female threaded elements, which is extremely vibration resistant by reason of the achievement of firm radial engagement between the crest of one thread form and the root of the other thread form. By the term "prevailing-torque," I refer to a threaded fastener combination which requires a given and substantial turning force to move the threaded elements over one another even in the absence of axial load. This is to be contrasted with a free-running combination in which the turning force is insubstantial until axial tensioning develops.

In general, I accomplish this object through the provision of conjugate threaded elements, one of which exhibits normal well-defined flank intersections at one diameter, and substantially truncated or foreshortened flanks at the other diameter, such that when the elements are threaded together, firm radial contact occurs at the mating point of the truncation surface and the crest of the other element. In addition, the threads are shaped to provide clearance between corresponding flanks thereby to accommodate material which is deformed from the crest of said other element during the threading process.

In the preferred form, I provide a female threaded element, the flanks of which are more greatly angled than the corresponding flanks of the male element with which it is intended to mate, thereby to provide longitudinal clearance between the crest of the male and the roots of the female threads when engaged, and a helical surface of truncation formed over at least a portion of the female root which is of lesser diameter than that of the male crest so as to produce firm radial contact therebetween when said elements are threadedly engaged. In stating that the female root is of "lesser diameter" than the diameter of the male crown, I intend to embrace not only a combination in which the difference between the diameters are significantly different, but also one in which the difference is substantially unmeasurable; i.e., the diameters are substantially the same. However, because of the tolerances which are normally required in standard manufacturing practices, it is realistic and accurate to anticipate that the skilled artisan will design and strive for a perceptible difference in diameters as aforesaid.

Because a perceptible difference in diameters between the male crest and the female root necessarily results in material deformation and a flattening or spreading of the material at the crest of the male thread, I have found that the longitudinal clearance provided by a perceptible difference in flank angles as between the male and female thread forms is required. This longitudinal clearance permits a helical volume of open space into which the deformed material can flow, thus to eliminate or substantially reduce any tendency to bind the fastener combination and make assembly or disassembly unnecessarily difficult.

I have also disclosed herein tapping tools which are capable of generating thread forms realizing the end objectives of my fastener invention as set forth above. In one form, the tapping tool is characterized by a cutting thread form having a constant diameter helical root over the working length thereof and a flat truncated crown or crest at a shallower or lesser diameter than that which would normally be associated with a male thread form having conjugally matable pitch and flank angles. In another form, I provide a tapping tool having a substantially constant diameter root and a varying diameter crest, the later-engaged crest diameter being the greater so as to result in a female thread form, the initial threads of which are substantially free-running thereby to permit easy early engagement of the elements, and the latter threads of which are of a reduced diameter so as to produce the prevailing torque effect and the firm radial engagement which is necessary to the realization of my inventive objectives.

The invention will be better understood from a reference to the following detailed descriptions and the accompanying drawings.

BRIEF DESCRIPTION OF THE DRAWINGS

FIG. 1 is a view of a fastener combination comprising a machine bolt and nut constructed in accordance with the invention and being partially threaded together;

FIG. 2 is an enlarged sectional view through the fastener combination of FIG. 1 illustrating the internal configuration and self-locking phenomenon which occurs;

DETAILED DESCRIPTION OF THE SPECIFIC EMBODIMENTS

Figure 3:
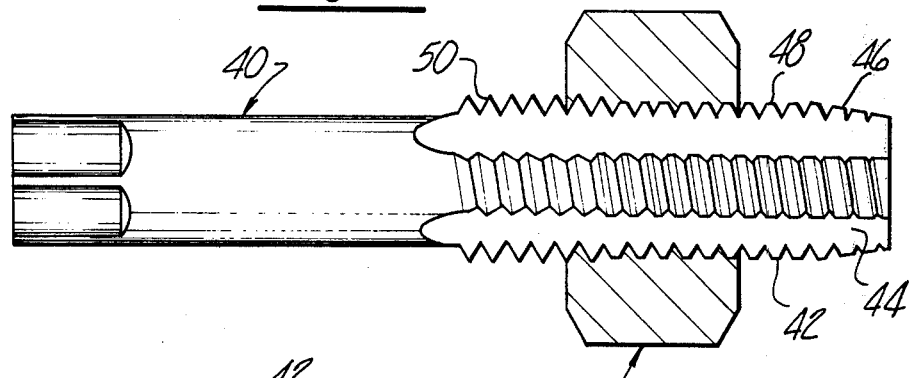
FIG. 3 is a side view of a tapping tool useful in manufacturing the thread form of the female element in the combination of FIG. 2.

FIG. 1 shows a fastener combination to comprise a male element in the form of a machine bolt 10 and a female element in the form of a nut 12 which is conjugally threaded onto the machine bolt 10 sufficiently to illustrate the effects of the preferred implementation of the invention. Machine bolt 10 includes an enlarged head having flat surfaces 14 formed thereon for application of a wrench or other torquing device, and a reduced diameter shank 16 approximately half of which is provided with conventional helical thread form 18. Note that the crests of the thread form 18 between the nut 12 and the unthreaded shank portion 16 are characterized by relatively sharp intersection of the leading and trailing thread flanks. Because the nut 12 is constructed in accordance with the invention as hereinafter set forth, a firm radial engagement between the crest of the bolt thread form and the root of the nut thread form has been achieved; this has been evidenced by the flattening of the crests on the threaded portion 20 between the end of the bolt 10 and the nut 12 as is apparent in FIG. 1.

Referring now to FIG. 2, a substantially enlarged section through the fastener combination of FIG. 1 reveals the configurations of the nut and bolt thread forms which give rise to the self-locking and prevailing torque effects. The bolt 10 is manufactured according to conventional practices to exhibit a thread form having leading and trailing flanks 22 and 24 which lie at first, equal and opposite angles relative to the thread axis; i.e., the center line of the bolt 10. The flanks 22 and 24 intersect to define a helical root having a constant radius RMR over the working length of the bolt 10. The flanks 22 and 24 also define a relatively sharp crest which initially, i.e., prior to assembly with the nut 12, has a constant radius RMC over the entire working length of the bolt 10.

The female fastener or nut 12 is manufactured to provide thread form flanks 26 and 28 which correspond to the leading and trailing flanks 22 and 24 of the bolt 10 but which lie at second equal and opposite angles relative to the thread axis, which angles are greater than the angles of the flanks 22 and 24. Accordingly, a longitudinal clearance initially exists between the flanks of the bolt and the flanks of the nut if projected over one another without actual threaded engagement. In addition, the female thread form includes over at least a portion of its length a flat helical surface of truncation 30 which is caused by a foreshortening of the female thread form from the thread depth which would obtain if the flanks 26 and 28 were continuous to intersection in the conventional manner. Adjacent the surface 32 of the nut 12 the truncation or foreshortening is minimal or zero so as to result in a first radius RF1 which is slightly greater than the radius RMC so as to facilitate early engagement and correct threading or seating of the nut 12 on the threads of the bolt 10. About 1½ turns will suffice. However, toward the opposite surface of the nut 12, the truncation is increased so as to result in a second lesser radial dimension RF2 which is not only less than the dimension RF1 but also less than the dimension RMC. By way of example, the difference between RF1 and RF2 may be on the order of 0.017" for a 7/16-14 bolt. Accordingly, when the nut 12 is threaded onto the bolt 10 more than 1½ turns, firm radial engagement between the crest of the male thread form and the root 30 of the female thread form obtains and a prevailing torque effect quickly results. As the nut 12 is threaded farther and farther onto the bolt 10, the sharp crests of the male thread form are deformed and flattened off as shown at 34, material from the flattening process flowing into and occupying part of the longitudinal clearance which had previously existed between the male and female thread forms. This clearance provides adequate volume to receive the material from the male thread form as it is deformed and thus prevents any binding effect which might otherwise occur.

It is of course clear that the entire female thread form root may be formed at the dimension RF2 in which case it is desirable that the first one or two threads of the bolt 10 are of a reduced diameter thus to obtain proper seating and threading of the elements. Also, the invention may be embodied in an asymmetric thread form if desired; i.e., one in which the leading and trailing flank angles are dissimilar.

Figure 4:
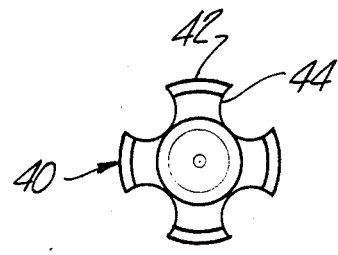
FIG. 4 is an end view of the tap of FIG. 3.

Referring now to FIGS. 3 and 4, a tap 40 which is useful in generating a female thread form of the type shown in FIG. 2 will be described in detail.

Tap 40 comprises an elongated cylindrical body having thread form ridges 42 separated by four circumferentially spaced flutes 44. The right end of the tap 40 as shown in FIG. 3 comprises an entry or pilot portion 46 followed by a working length about half or more of which is characterized by truncated cutting teeth 48 of constant pitch and flank angle and of constant major and minor diameters; i.e., the diameter of the tap measured between roots is constant and the diameter of the tap measured between thread form crests is also constant. The final one-third of the working length of tap 40 is characterized by full crested or non-truncated cutting teeth 50 also arranged in a spiral or helical pattern of constant pitch and flank angle equal to the pitch and flank angle of the truncated teeth 48. Although the minor diameter of the full crested teeth is equal to that of the truncated teeth, the major diameter; i.e., the distance measured diametrically between crests, is greater than that of the major diameter of truncated teeth 48. It is clear that in tapping a bored or formed hole in a nut such as female fastener 12 in FIG. 2, the truncated cutting teeth 48 form the truncated or clamping thread form portions having the surface 30 where firm radial engagement with the bolt occurs and the full crested cutting teeth 50 form the initial high clearance female thread forms shown to the left of female fastener 12 in FIG. 2. Appropriate depth control is exercised in the tapping process.

Figure 5:
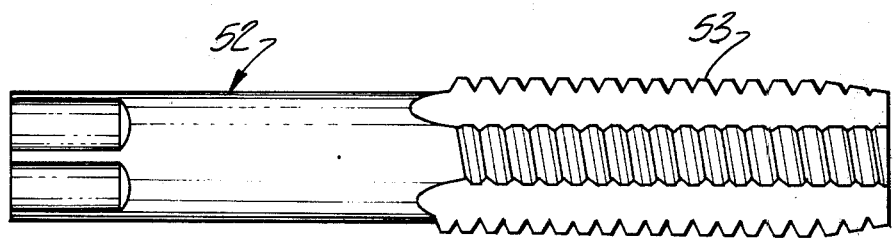
FIG. 5 is a side view of another tapping tool.
Figure 6:
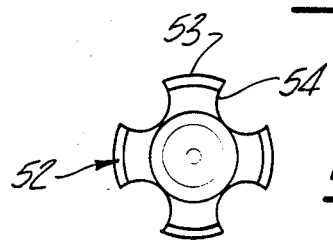
FIG. 6 is an end view of the tapping tool of FIG. 5.

FIGS. 5 and 6 illustrate a second tap 52 which is also elongated and cylindrical and provided with four rows of cutting teeth 53 separated by flutes 54. The major difference between the tap 52 of FIGS. 5 and 6 and the tap 40 of FIGS. 3 and 4 lies in the fact that the cutting teeth are truncated throughout the entire length of the tap so as to result in a female thread form exhibiting the surface of truncation 30 evident in FIG. 2 over the entire length of the thread form. As stated above, although the reduced diameter thread form which results from the use of the tap 52 may be used in combination with a conventional threaded bolt, it is preferable from the application standpoint to utilize a bolt having reduced diameter threads for one or two turns adjacent the entry end of the bolt so as to facilitate proper seating and threading of the fastener combination when threaded engagement is first begun.

The flank angles of both of the taps 40 and 52 are selected to be substantially steeper than the flank angles of a standard bolt having a pitch and thread diameter to be conjugal therewith. A difference of about 15° is contemplated, although this figure is not intended by way of limitation. Accordingly, the fastener combination results in the longitudinal clearance which is evident in FIG. 2 and described above.

Figure 7:
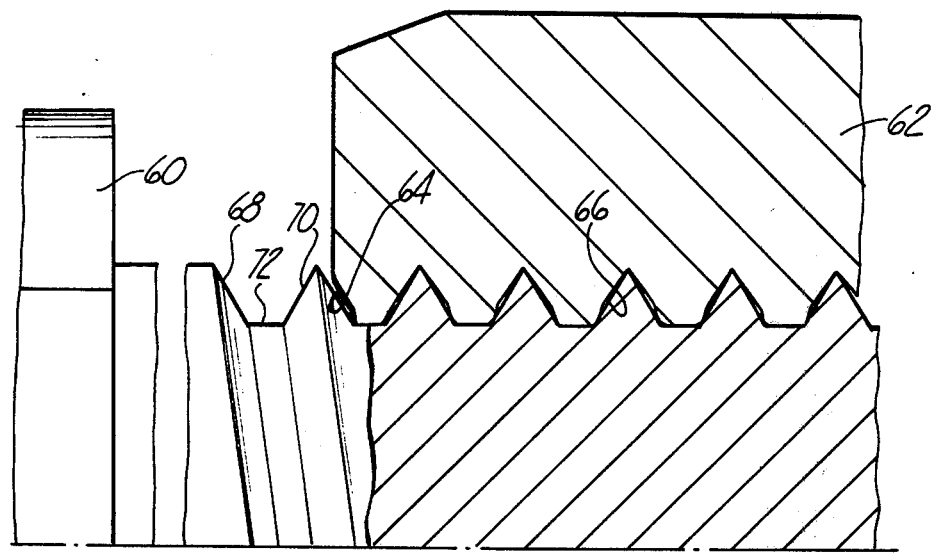
FIG. 7 is a side view, partly in section, of an alternative thread form where the truncated flanks are on the male thread.

FIG. 7 illustrates a fastener combination comprising bolt 60 and conjugate nut 62. The thread form of the nut 62 is conventional, comprising helical flanks 64 and 66 which, before the nut is threaded onto the bolt 60, exhibit conventionally sharp crest and root formations at the major and minor diameters thereof. Both the major and minor diameters are constant over the working length of the nut. The bolt thread, however, comprises steep-angled helical flanks 68 and 70 which form sharp crests at the major diameter but are substantially truncated at the minor diameter to form surface 72. The thread depth of the bolt is therefore less than the thread depth of the nut.

When threaded together, the crest of the nut 62 firmly engages the surface 72 and deforms the nut crest to fill the lateral clearance between flanks and to provide the feel associated with a prevailing torque fastener.

Various modifications and applications to the invention as described above are possible; for example, the female thread form may be formed not only in a nut or other discrete fastener but also in a blind hole, threaded insert or other device. The nut 12, although not necessarily requiring a separate heat treating or hardening process, may be selected so as to exhibit slightly greater hardness than the material of the male fastener so as to facilitate the deformation or Brinneling of the male thread form crest. I have also found that the clearance between thread flanks may be achieved in a combination having relatively similar flank angles in both nut and bolt. While I do not disclaim such a combination, I prefer the dissimilar flank angles because of the greater strip-strength which results. I can also apply my invention to prevailing torque nuts which are made of very hard materials and deformed such that the firm lateral contact referred to above is discontinuous around the circumference of the thread forms.

The embodiments of the invention in which an exclusive property or privilege is claimed are defined as follows:

1. In a prevailing-torque fastener combination:
 a first element having a helical thread form with leading and trailing flanks which lie at respective first angles to the thread axis and which, before threaded engagement with another element, intersect to define a crest of substantially constant diameter over the working length of said element;
 a second element having a helical thread form with leading and trailing flanks which lie at respective second angles relative to the thread axis and which are truncated to define a root surface;
 the first and second elements being conjugally threadable with one another;
 at least a portion of the second element having a thread depth of lesser dimension than the thread depth of the first element thereby to cause firm radial engagement between the crest of the first element and the root surface when said elements are at least substantially fully threaded together;
 the threads of said elements being configured to create longitudinal clearance between the flanks adjacent the engaging crest and truncated root sufficient to receive deformed material from said engaging crest when threaded together.

2. The combination defined in claim 1 wherein the first angles are the same and the second angles are the same such as to produce symmetrical thread forms in each of said male and femal elements.

3. In a prevailing torque-fastener combination:
 a male element having a helical thread form with leading and trailing flanks which lie at respective first angles to the thread axis and which intersect to define a crest of substantially constant diameter over the working length of said element;
 a female element having a helical thread form with leading and trailing flanks which lie at respective second angles relative to the thread axis and which intersect to define a root;
 the first and second elements being conjugally threadable with one another;
 at least a portion of the female thread form root being of lesser diameter than the male crest to cause firm radial engagement therebetween when said elements are at least substantially fully threaded together;
 the second angles being greater than the corresponding first angles to create longitudinal clearance between the flanks adjacent the male crest and female root sufficient to receive deformed material from one of said elements when threaded together.

4. The combination defined in claim 3 wherein the root of the female element is truncated to form a helical flat.

5. The combination defined in claim 4 wherein the helical flat is substantially parallel to the thread axis.

6. The combination defined in claim 4 wherein said female element exhibits a crest of constant diameter and a root of varying diameter such that at least partial threaded engagement between the male and female elements can be achieved before radial engagement between the male crest and the female root occurs.

7. The combination defined in claim 2 wherein the first angles are the same and the second angles are the same such as to produce symmetrical thread forms in each of said male and female elements.

8. For use in combination with a male threaded element having angled flanks and a constant thread diameter:
 a female threaded element, the flanks of which lie at a greater angle relative to the thread axis than the corresponding flanks of the male element to provide longitudinal clearance between the flanks adjacent the crest of the male element and the root of the female element when the two elements are engaged, and a helical surface of truncation formed over at least a portion of the female root and which is of lesser diameter than the diameter of the male crown so as to produce firm radial engagement between said elements when substantially fully threadedly engaged.

9. Apparatus as defined in claim 8 wherein the female element is characterized by a constant diameter crest and a varying diameter root, the greater root diameter being contiguous to one end of the thread form to permit a free-running starting engagement.

10. The apparatus defined in claim 8 wherein the angles of the flanks are equal and opposite so as to create a symmetrical thread form.